United States Patent [19]
Hirata

[11] Patent Number: 5,954,633
[45] Date of Patent: Sep. 21, 1999

[54] ENDOSCOPE OPTICAL SYSTEM

[75] Inventor: Tadashi Hirata, Hachioji, Japan

[73] Assignee: Olympus Optical Co., Ltd., Tokyo, Japan

[21] Appl. No.: 08/694,242

[22] Filed: Aug. 8, 1996

[30] Foreign Application Priority Data

Aug. 18, 1995 [JP] Japan .................................... 7-210753

[51] Int. Cl.$^6$ ................................................. H04N 7/18
[52] U.S. Cl. ...................... 600/108; 600/181; 359/589; 359/590; 359/723
[58] Field of Search .................................. 600/108, 181, 600/478, 473, 476, 171, 175; 359/722, 723, 355, 356, 589, 590, 357; 348/67

[56] References Cited

U.S. PATENT DOCUMENTS

| | | | |
|---|---|---|---|
| 4,170,997 | 10/1979 | Pinnow | 600/108 |
| 4,418,689 | 12/1983 | Kanazawa | 600/181 |
| 4,916,534 | 4/1990 | Takahashi et al. | 600/108 |
| 4,987,483 | 1/1991 | Tsukagoshi | 359/722 |
| 4,987,884 | 1/1991 | Nishioka | 600/108 |
| 5,177,605 | 1/1993 | Takahashi et al. . | |

FOREIGN PATENT DOCUMENTS

| | | |
|---|---|---|
| 55-43053 | 3/1980 | Japan . |
| 6-63009 | 9/1994 | Japan . |

*Primary Examiner*—Jeffrey A. Smith
*Assistant Examiner*—Ira Hatton
*Attorney, Agent, or Firm*—Pillsbury Madison & Sutro LLP

[57] ABSTRACT

An endoscope optical system is used in an endoscope which can be combined with at least two laser treatment units that produce different wavelengths. At least two filters for removing laser light are provided in the path of the optical system, and are arranged at positions where angles of incidence or emergence of a chief ray are different. In this way, even with the laser treatment units using a plurality of wavelengths, laser light of the plurality of wavelengths can be removed.

11 Claims, 5 Drawing Sheets

ENDOSCOPE OPTICAL SYSTEM

BACKGROUND OF THE INVENTION

1. Field of the Invention

This invention relates to an endoscope optical system which is used in an endoscope combined with lasers for irradiating affected parts in a human body with laser light to take medical treatment while observing the affected parts.

2. Description of Related Art

Endoscopes have been widely used for observation diagnoses and medical treatments of stomachs, large intestines, and the like. In particular, medical treatment with laser light is being popularized for which a laser treatment unit is employed to cut out, cut off, or cauterize the affected parts in the human body. As lasers for medical treatment of such laser treatment units, YAG lasers producing light of wavelength 1060 nm have been chiefly used, but in recent years, small-sized, inexpensive semiconductor lasers have come into use. The wavelengths of light emitted from the semiconductor lasers for medical treatment vary from 750 to 1050 nm.

More recently, on the other hand, electronic endoscopes have been used in which a solid-state image sensor (hereinafter referred to as "CCD") is placed at the distal end or eyepiece section of the endoscope to make observations through a monitor TV. The CCD is sensitive to near-infrared light, and thus when the medical treatment is taken by the YAG laser or the semiconductor laser, reflected light in a near-infrared wavelength region from parts to be treated falls on the CCD. Consequently, the problem is encountered that the image plane of observation is too bright to view an object.

Thus, an endoscope optical system is proposed, for example, by Japanese Utility Model Preliminary Publication No. Sho 55-43053, in which filters for eliminating light emitted from the YAG laser or the semiconductor laser (hereinafter referred to as "laser cut filters") are provided in the optical path of the imaging optical system of the endoscope optical system so that a normal image can be displayed even in laser treatment. Most of such laser cut filters are multilayer film interference filters for reflecting light of wavelengths emitted from the laser. It is desired that the multilayer film interference filter reflecting laser light minimizes a transmittance in the wavelength region of the laser light to completely remove the laser light, has the highest possible transmittance in the wavelength region of visible light to secure a bright, normal observation image, and holds the transmittance constant (namely, minimizes a ripple) in the wavelength region of visible light to improve color reproducibility.

In general, the interference filter is such that when the angle of incidence of a ray of light thereon is varied, its optical properties change in such a manner that spectral transmittance characteristics and the ripple in the visible region largely change. Here, the angle of incidence of a ray of light indicates an angle made by the normal of the coating surface of the interference filter with the ray incident on the interference filter. Also, the interference filter has a tendency that if the elimination rate of laser light is increased or the range of wavelengths to be eliminated is extended, its optical properties will be considerably changed as the angle of incidence of the ray increases.

The endoscope combined with the laser treatment unit also has the multilayer interference laser cut filters in the endoscope optical system to cut laser light. However, the use of filters such that the optical properties vary greatly with the angle of incidence of the ray causes the coloring of an observation image to be changed, resulting in degraded color reproducibility. In this case, if the number of film layers of each filter is increased in order to minimize the dependence of the optical properties on the incident angle and cut a wide band of wavelengths, the problem will arise that the surface profile of the laser cut filter is deteriorated because not only is the fabrication of the filter difficult, but also the interference film becomes liable to peel and damage.

In order to solve these problems, for example Japanese Utility Model Preliminary Publication No. Hei 6-63009 proposes that interference films for removing light of wavelengths different from each other are provided on both surfaces of each optical element placed in the optical path of the endoscope optical system. According to this prior art, even where the range of wavelengths cut by each individual interference film filter remains narrow, light of wavelengths corresponding to various kinds of laser light of different wavelengths can easily be removed to secure a good image which is not affected by laser light.

The foregoing prior art, however, does not in any way refer to the position where each laser cut filter is located. If the laser cut filter is placed at the position where the incident angle of a light ray is relatively large, color variation may affect the image. Furthermore, the prior art is such that, for example, two particular kinds of laser light, such as semiconductor laser light with a wavelength of 800 nm and YAG laser light with a wavelength of 1060 nm, can be eliminated, but laser light of other wavelengths cannot be removed.

Wavelengths emitted from the semiconductor laser vary from 750 to 1050 nm, depending upon its type, and this where various semiconductor lasers and YAG lasers are used, it is necessary to remove laser light over a considerably wide range of wavelengths. In this case, the characteristics of the interference films provided on the surfaces of the optical elements to remove light of different wavelengths must be such that laser light having a wide range of wavelengths can be removed.

If the interference films are designed to have the characteristics such that laser light can be removed in a wide range of wavelengths, however, the following problems will be encountered.

In the first place, if each filter is located at the position where the incident angle of the ray becomes large, a change of spectral transmittance characteristics and the ripple in the visible region will increase, and the observation image will have a difference in color between the center and the periphery thereof. The result is that the image plane of observation becomes hard to see and, for example, a change to a morbid state of a patient may escape notice. In the second place, to remove light having a wide range of wavelengths, each filter used must have a thick interference film with an therefor unfavorable surface profile. If the filter is situated at the position where a bean of light is fine, flaws in the surface of the filter will be conspicuous on the image plane, which becomes hard to see. In the third place, where both surfaces of the optical element are coated with the interference films, one surface is first coated, and then followed by the other. This member requires heating when coated, and thus the thermal expansion of the member on heating may cause the primary interference film coating to crack or peeled off.

SUMMARY OF THE INVENTION

It is, therefore, an object of the present invention to provide an endoscope optical system in which even with the use of laser treatment units employing a plurality of wavelengths, laser light having the plurality of wavelengths can be removed and thus not adversely affecting the observation image, and color reproducibility is good and a favorable observation image can be obtained.

In order to achieve this object, the endoscope optical system according to the present invention is used in an endoscope combined with at least two kinds of laser treatment units emitting different wavelengths so that at least two filters for removing laser light are provided in the path of the optical system and are arranged at respective positions where angles of incidence or emergence of a chief ray are different.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
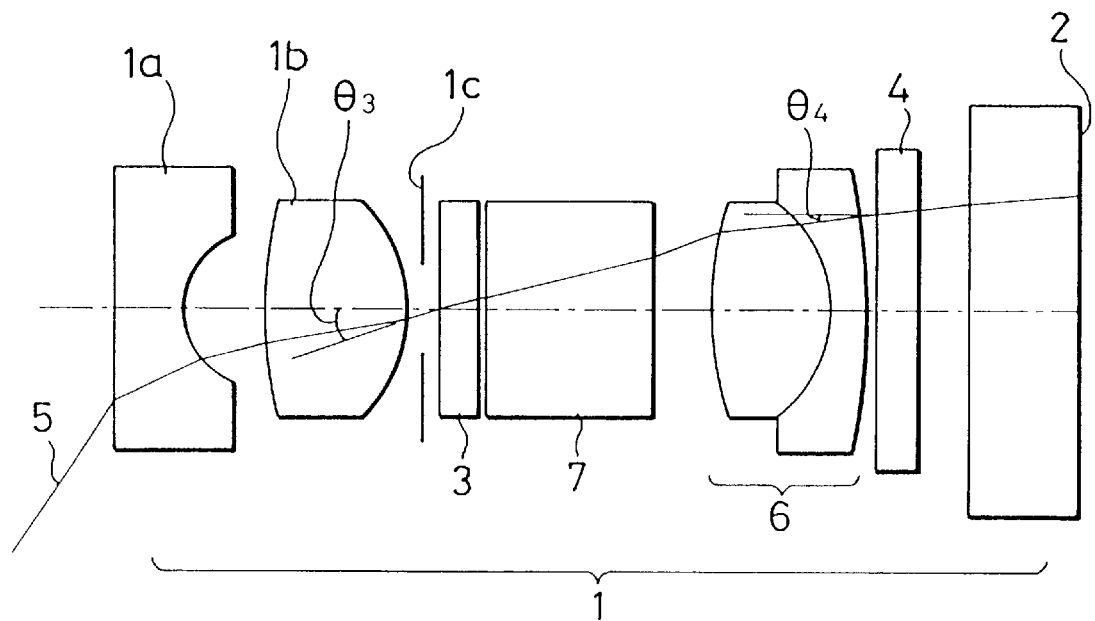
FIG. 1 is a sectional view showing the arrangement of a first embodiment of the endoscope optical system according to the present invention.

Before undertaking the description of the embodiments, it will be expedient to explain the function of the endoscope optical system according to the present invention.

The endoscope optical system of the present invention is designed so that the above-mentioned at least two filters for removing laser light can respectively remove laser light having different wavelengths.

Further, the endoscope optical system of the present invention is designed so that the above-mentioned at least two filters for removing laser light are arranged in such a way that a surface or optical element having a refracting power is interposed therebetween.

In the present invention, each of the filters for removing laser light is such that, for example, the surface of an optical element, such as a plane-parallel plate or a lens, is coated with an interference film capable of removing laser light. Also, the angle of incidence of a chief ray indicates an angle between the normal of the surface of the interference film for removing laser light and an off-axis chief ray when the chief ray is incident from the air on the interference film, while the angle of emergence indicates an angle between the normal of the surface of the interference film and the off-axis chief ray when the chief ray emerges from the interference film into the air.

If the filters for removing laser light (hereinafter referred to as "laser cut filters") are composed of at least two, thereby eliminating wavelengths in different ranges, various kinds of laser light having different wavelengths can be removed without increasing the number of layers of the interference film of any laser cut filter in the optical system.

Moreover, these two laser cut filters are arranged at respective positions where angles of incidence of the chief ray vary, for example, in such a way that a surface or optical element having a refracting power is interposed between the two laser cut filters. In doing so, the laser light of a plurality of wavelengths can be removed and thus does not adversely affect the observation image color reproducibility is good, and a favorable observation image can be obtained.

Still further, the endoscope optical system of the present invention is such that the above-mentioned at least two filters for removing laser light includes a wide-band cut filter $F_w$ and a narrow-band cut filter $F_n$, which are arranged at positions satisfying the following condition:

$$\theta n > \theta w \quad (1)$$

where $\theta w$ and $\theta n$ are angles of incidence or emergence at coated surfaces of the filters $F_w$ and $F_n$, respectively for removing laser light. Here, the wide-band cut filter $F_w$ and the narrow-band cut filter $F_n$ are defined as follows: The maximum and minimum values of the wavelength region in which one, of the two filters for removing laser light, has a transmittance of 1% or less are represented by $\lambda w$, max and $\lambda w$, min, respectively, and the maximum and minimum values of the wavelength region in which the other has a transmittance of 1% or less are represented by $\lambda n$, max and $\lambda n$, min, respectively. When $$\lambda w, max-\lambda w, min > \lambda n, max-\lambda n, min$$

the former filter is defined as the wide-band cut filter $F_w$ and the latter filter as the narrow-band cut filter $F_n$.

The following is the reason why the definition of each of the wide- and narrow-band cut filters is framed on the basis of the extent of the wavelength region in which the transmittance of the filter becomes 1% or less. In order that laser light does not adversely affect the observation image, the transmittance of the laser cut filter is no more than 1%, and beyond this, the laser light will produce a bad effect on the image. Hence the wavelength region in which the transmittance of the laser cut filter becomes 1% or less is set to the limit of the wavelength region in which the laser light can be removed by the laser cut filter. However, where the power of the laser treatment unit is either high or low, it is necessary to change the spectral transmittance, in accordance with the power of the laser, for example, to 0.1% or less, 0.5% or less, 5% or less, 10% or less, etc., to limit the wavelength region in which the laser light can be removed by the laser cut filter.

In general, the dependence of optical properties on the incident angle of a ray in the wavelength region of visible light increases as the wavelength region of the light removed by the laser cut filter is widened. Thus, since the narrow-band cut filter $F_n$ has less of a dependence of the optical properties of visible light on the incident angle of the ray it can be located at the position where the incident angle $\theta_n$ of the chief ray becomes larger. If, however, the wide-band cut filter $F_w$ that has a greater dependence of the optical properties on the incident angle is located at the position where the incident angle $\theta_w$ of the chief ray becomes larger, the color reproducibility of the observation image will deteriorate. For this reason, if the filters $F_n$ and $F_w$ are arranged to satisfy Eq. (1), an adverse effect of the filter $F_w$ on the wavelength band or visible light will be lessened and thus the observation image of good color reproducibility can be derived.

In the following description, the elimination rate of laser light is a value indicating how the intensity of incident laser light can be lessened and, with respect to the transmittance of a filter, has the relation: elimination rate=1–transmittance.

Still further, the endoscope optical system of the present invention is such that one of the above-mentioned at least two filters for removing laser light is different from the other in the elimination rate of laser light, and a filter $F_{rl}$ in which the elimination rate of laser light is low and a filter $F_{rh}$ in which the elimination rate of laser light is higher are arranged at positions satisfying the following condition:

$$\theta_{rl} > \theta_{rh} \tag{2}$$

where $\theta_{rl}$ and $\theta_{rh}$ are angles of incidence and emergence at coated surfaces of the filters $F_{rl}$ and $F_{rh}$, respectively, for removing the laser light.

As mentioned above, the dependence of the optical properties on the incident angle of the ray in the wavelength band of visible light increases as the wavelength region of the light removed by the laser cut filter is widened. This dependence, however, increases even when the elimination rate of light of the laser cut filter becomes high (namely the transmittance is low). Thus, the laser cut filter $F_{rl}$ of a low elimination rate that has less of a dependence of the optical properties of visible light on the incident angle can be located at the position where the incident angle $\theta_{rl}$ of the chief ray becomes large. If, however, the laser cut filter $F_{rh}$ of a higher elimination Rate that has a greater dependence of the optical properties on the incident angle is located at the position where the incident angle $\theta_{rh}$ of the chief ray becomes larger, then the color reproducibility of the observation image will deteriorate. For this reason, if the filters $F_{rl}$ and $F_{rh}$ are arranged to satisfy Eq. (2), an adverse effect of the filter $F_{rl}$ on the wavelength band of visible light will be lessened and thus the observation image of good color reproducibility can be obtained.

Although the above description has been made of the ray incident on the laser cut filters, the sane holds for the case of the ray emerging therefrom.

Further, the endoscope optical system of the present invention is used in an endoscope which can be combined with at least two types of laser treatment units producing different wavelengths so that at least two filters for removing laser light are provided in the path of the optical system and are arranged at respective positions where the diameters of a beam of light are different.

Still further, the endoscope optical system of the present invention is such that the above-mentioned at least two filters for removing laser light includes the wide-band cut filter $F_w$ and the narrow-band cut filter $F_n$, which are arranged at positions satisfying the following condition:

$$SF_w < SF_n \tag{3}$$

where $SF_w$ is a distance between an aperture stop S and the filter $F_w$ and $SF_n$ is a distance between the aperture stop S and the filter $F_n$. Here, the wide- and narrow-band filters $F_w$ and $F_n$ are defined as already described.

Still further, the endoscope optical system of the present invention is such that one, of the above-mentioned at least two filters for removing laser light, is different from the other in the elimination rate of laser light, and a filter $F_{rl}$ in which the elimination rate of laser light is low and a filter $F_{rh}$ in which the elimination rate of laser light is higher are arranged at positions satisfying the following condition:

$$SF_{rl} > SF_{rh} \tag{4}$$

where $SF_{rl}$ is a distance between the aperture stop S and the filter $F_{rl}$ and $SF_{rh}$ is a distance between the aperture stop S and the filter $F_{rh}$.

Of the laser cut filters, the laser cut filter $F_{rh}$ or wide-band cut filter $F_w$ which is comparatively poor in surface profile but is high in the elimination rate of laser light is situated, close to the aperture stop S, at the position where the diameter of the light beam is large, thereby preventing the surface profile from adversely affecting the observation image. On the other hand, the laser cut filter $F_{rl}$ with a lower elimination rate of laser light or the filter $F_n$ in which the wavelength region to be removed is in a narrower band is smaller in thickness of the interference film than the filter $F_{rh}$ or $F_w$, and thus the surface profile is comparatively good. Consequently, even when the filter $F_{rl}$ or $F_n$ is placed, father from the aperture stop S than the filter $F_{rh}$ or $F_w$, at the position where the diameter of the light beam is smaller, the observation image will not be adversely affected by tile surface profile.

In this way, the laser cut filters are arranged so as to satisfy Eqs. (3) and (4), and thereby the entire optical system can be constructed so that the surface profile or each laser cut filter has no adverse effect on the observation image.

Further, the endoscope optical system of the present invention is used in an endoscope which can be combined with at least two types or laser treatment units producing different wavelengths so that at least two filters $F_a$ and $F_b$ for removing laser light are provided in the path of the optical system, and the wavelength regions in which the filters $F_a$ and $F_b$ can remove laser light satisfy the following conditions:

$$\lambda a, max - \lambda a, min > \lambda b, max - \lambda b, min \tag{5}$$

$$\lambda a, min \leq \lambda b, min \tag{6}$$

$$\lambda a, max \geq \lambda b, max \tag{7}$$

where $\lambda a, max$ and $\lambda a, min$ are maximum and minimum values of the wavelength region in which the filter $F_a$ can remove laser light and $\lambda b, max$ and $\lambda b, min$ are maximum and minimum values of the wavelength region in which the filter $F_b$ can remove laser light.

Such an arrangement is effective when only a particular laser, of a plurality of laser treatment units producing different wavelengths, is higher in power than the other.

Subsequently, the effect of laser light on the observation image will be considered below.

A brightness $A(\lambda)$ of laser light with a wavelength $\lambda$ on the observation image plane is given by $$A(\lambda) = k(\lambda) T(\lambda) S(\lambda) P(\lambda) \tag{8}$$

where $T(\lambda)$ is the transmittance of an objective optical system, $S(\lambda)$ is the spectral sensitivity of the CCD, $P(\lambda)$ is the power of a laser, and $k(\lambda)$ is a variable determined by the reflectance of an object, the F number of a lens, etc.

Further, the transmittance $T(\lambda)$ of the objective optical system is expressed by $$T(\lambda) = T_L(\lambda) T_A(\lambda) T_0(\lambda) \quad (9)$$

where $T_L(\lambda)$ is the transmittance of a laser cut filter, $T_A(\lambda)$ is the transmittance of an infrared absorption filter, and $T_0(\lambda)$ is a transmittance talking account of a loss caused at the surface or in the interior of a lens. Here, the transmittance of the infrared absorption filter is considered for the reason that since in the electronic endoscope the CCD possesses sensitivity to the infrared region as well, the endoscope optical system is provided with the infrared absorption filter having a low transmittance over the range from the long-wavelength side of the visible region to the infrared region to adjust the color balance of the observation image.

The brightness $A(\lambda)$ is such that when its value is small, no problem is caused to observations in the human body, but, beyond a certain allowable value $A_{th}$, laser light adversely affects the observation image and thus the observations in the human body become difficult. The transmittance $T_L(\lambda)$ of the laser cut filter required to prevent the laser light from adversely affecting the observation image can be derived from Eqs. (8) and (9) and the allowable value $A_{th}$ as $$T_L(\lambda) \leq A_{th}/k(\lambda) T_A(\lambda) T_0(\lambda) S(\lambda) P(\lambda) \quad (10)$$

According to Eq. (10) wavelengths such that the spectral transmittance of the laser cut filter must be made particularly low (namely, wavelengths such that the elimination rate must be made particularly high) are ones such that the spectral transmittance of the infrared absorption filter, followed by the sensitivity of the CCD and the power of the laser, is high.

Thus, where the power of a particular laser treatment unit is higher than that of another laser treatment unit, it is required that the transmittance of the laser cut filter in the wavelength region of the former laser unit is kept to a minimum.

When n laser cut filters are provided in the optical system, a total transmittance $T(\lambda)$ of these filters is expressed by $$T(\lambda) = T1(\lambda) T2(\lambda) \ldots Ti(\lambda) \ldots Tn(\lambda) \quad (11)$$

where $Ti(\lambda)$ is the spectral transmittance of the i-th laser cut filter. In this way, the transmittance of the entire optical system is proportional to the product of the transmittances of respective laser cut filters, and laser cut filters, without holding the transmittance of each filter very low.

In the endoscope optical system of tile present invention, the wavelength region from the minimum value $\lambda b$, min to the maximum value $\lambda b$, max is such that laser light is eliminated by both the laser cut filters $F_a$ and $F_b$. Thus, in this wavelength region, even though the transmittance of an individual laser cut filter is not held very low, the total transmittance of the laser cut filters can be reduced and light from a high-power laser can be eliminated. On the other hand, light in another wavelength region from a low-power laser is eliminated by the laser cut filter $F_b$ alone.

In this way, the wavelength regions in which laser light can be removed by the laser cut filters $F_a$ and $F_b$ are determined so that Eqs. (5) to (7) are satisfied, and thereby the films are constructed to such an extent that no problem is caused to appearance, the filters have no dependence on the incident angle, and a good image without color variation can be obtained.

The embodiments of the endoscope optical system according to the present invention will be explained in detail below with reference to the drawings.

Figure 2:
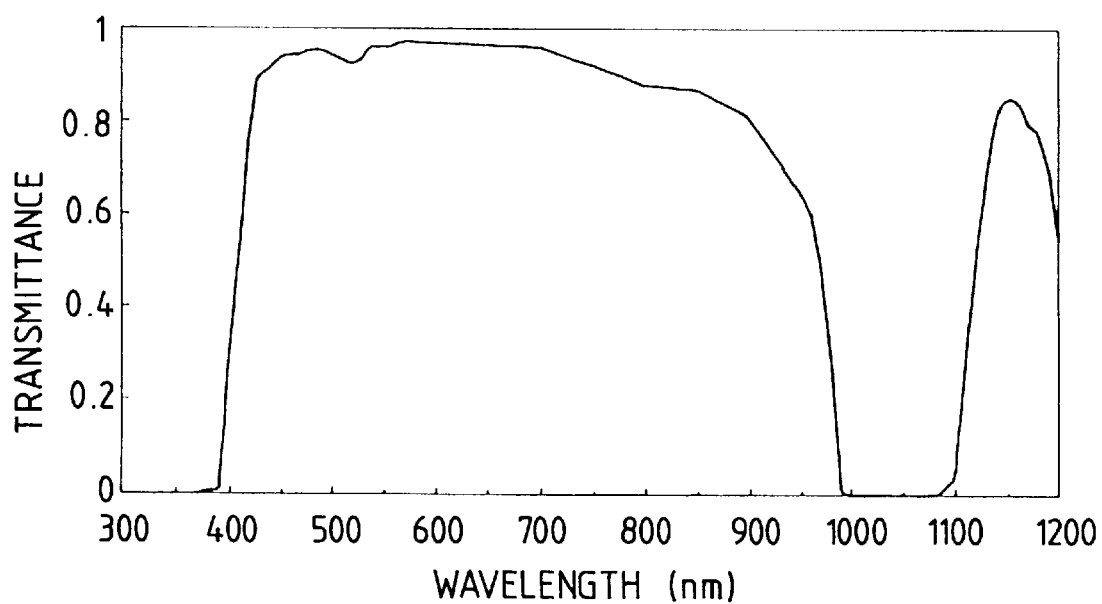
FIG. 2 is a graph showing spectral transmittance characteristics of a narrow-band cut filter.
Figure 3:
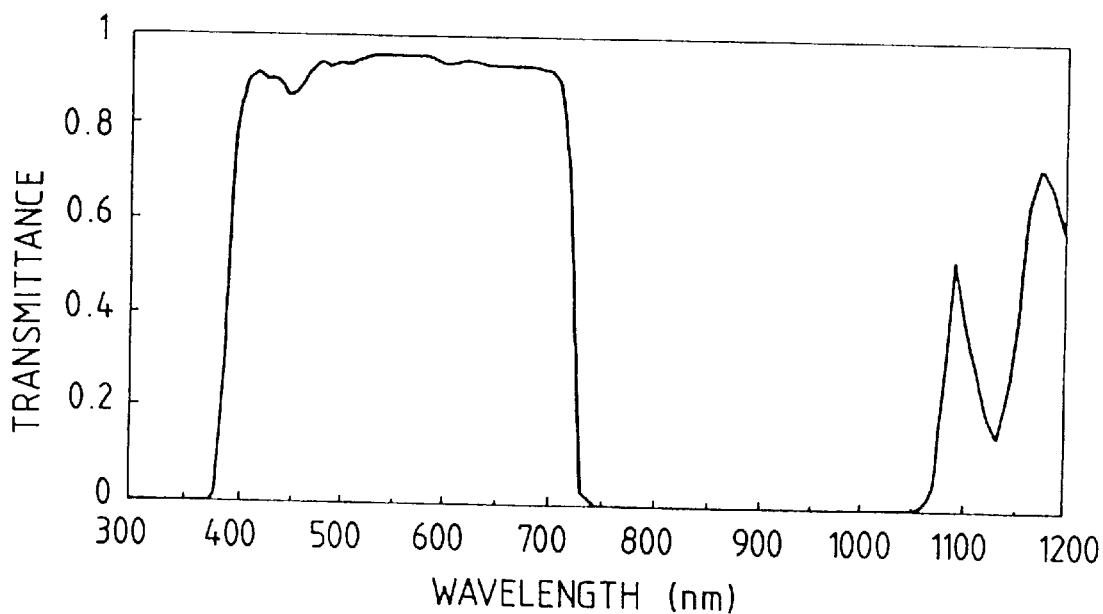
FIG. 3 is a graph showing spectral transmittance characteristics of a wide-band cut filter.

A first embodiment shown in FIGS. 1 to 3 refers to an endoscope optical system used in an endoscope combined with lasers for irradiating affected parts in a human body with laser light for medical treatment while observing the affected parts. The endoscope optical system of this embodiment, as shown in FIG. 1, has an objective optical system 1 provided at the distal end of the endoscope. A solid-state image sensor 2, such as a CCD, is located at the imaging position of the objective optical system 1. In the objective optical system 1, laser cut filters 3 and 4 for removing laser light are placed, and an infrared absorption filter 7 is interposed between the laser cut filters 3 and 4.

The infrared absorption filter 7 has a low transmittance over the range from the long-wavelength side of the visible region to the infrared region, and is provided for the purpose of preventing the color balance of the observation image from being destroyed because the CCD possesses sensitivity to infrared rays as well.

An off-axis chief ray 5 is incident on a stop 1c in a state where the inclination of the chief ray 5 to the optical axis is made gentle by a first negative lens 1a and a second positive lens 1b. The laser cut filter 3 is placed immediately behind the stop 1c, and an angle of incidence of the chief ray 5 on the laser cut filter 3 is represented by $\theta_3$. On the exit side of the infrared absorption filter 7 is disposed a cemented positive lens 6 which is an optical component having a refracting power. Thus, the chief ray 5 becomes gentler in inclination and is incident at an angle $\theta_4$ on the laser cut filter 4.

The spectral transmittance characteristics of the laser cut filters 3 and 4 are shown in FIGS. 2 and 3, respectively. The laser cut filter 3 is adapted to remove YAG laser light with a wavelength of 1060 nm and includes the narrow-band cut filter $F_n$ coated with an interference film in which the transmittance is kept to a minimum in a relatively narrow wavelength region including wavelengths of approximately 1060 nm. The laser cut filter 4, on the other hand, is adapted to remove semiconductor laser light, and because wavelengths emitted from a semiconductor laser vary from 750 to 1050 nm, is composed of a wide-band cut filter $F_w$ coated with an interference film in which the transmittance is kept to a minimum over a wide wavelength region including wavelengths of 750–1050 nm. In this way, the laser cut filters 3 and 4 are constructed so that laser light with different wavelengths can be removed, and are situated so that Eq. (1) is satisfied.

For changes of the optical properties (spectral transmittances and ripples in the visible region by the angle of incidence of the ray on the laser cut filters 3 and 4, the wide-band laser cut filter 4 is greater than the narrow-band laser cut filter 3. This is because the wide-band laser cut filter 4 is designed so that light can be removed in a wider range of wavelengths. The wide-band cut filter 4 is located at the position where the incident angle of the chief ray is smaller, thus lessening an influence on visible light. The narrow-band cut filter 3, on the other hand, only removes wavelengths in a narrower region, and thus even though the incident angle of the chief ray is increased, the change of the optical properties in the visible region will be less. For this reason, the narrow-band laser cut filter 3 is located at the position where the incident angle of the chief ray is larger than in the laser cut filter 4 (namely, $\theta_3 > \theta_4$). By such an arrangement, the endoscope optical system of the present invention allows the influence of each laser cut filter on the transmittance and ripple of visible light to be lessened, and consequently an observation image with good color reproduction can be secured.

Furthermore, in the first embodiment, since the laser cut filter 3 has little influence on visible light even when the incident angle of the chief ray is relatively large, it is not necessary to arrange the two laser cut filters 3 and 4 in series immediately before tile CCD where the incident angle of the chief ray is smaller. It is therefore possible to diminish the back focal distance, entire length, and outside diameter of the optical system.

Figure 4:
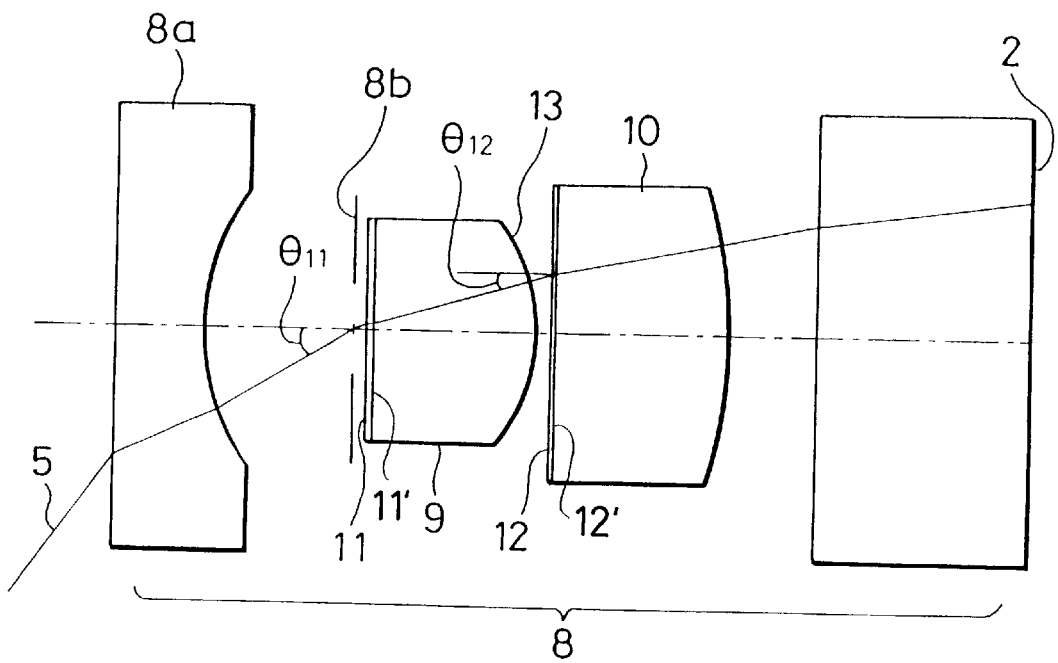
FIG. 4 is a sectional view showing the arrangement of a second embodiment of the endoscope optical system according to the present invention.

FIG. 4 shows the arrangement of a second embodiment of the endoscope optical system according to the present invention. In this embodiment, a lens 10 constituting an objective optical system 8 is such that one surface of an infrared absorption filter is provided with curvature to configure a lens. By doing so, the entire length of the optical system can be reduced.

Moreover, in the second embodiment, lenses are coated directly with interference films which serve as filters for removing laser light. Specifically, interference films 11 and 12 for removing laser light are formed as coatings at positions where the angles of incidence of the chief ray are different, namely, on surfaces 11' and 12', directed toward an object, or first and second positive lenses 9 and 10 in the objective optical system 8 of the endoscope. The interference films 11 and 12 are arranged in such a way that a surface 13 having a refracting power is interposed therebetween.

The off-axis chief ray 5 is incident on a stop 8b in a state where the inclination of the ray 5 to the optical axis is made gentle by a first negative lens 8a. The laser cut filter 11 is placed on the entrance surface 11' of the first positive lens 9 situated immediately behind the stop 8b, and the angle of incidence of the chief ray 5 on the laser cut filter 11 is represented by $\theta_{11}$. The chief ray 5 is made gentler in inclination by the positive power of the first positive lens 9, and is incident at an angle $\theta_{12}$ on the laser cut filter 12 placed on the entrance surface 12' or the second positive lens 10. Subsequently, the chief ray 5 enters the CCD 2 located at the imaging position of the objective optical system 8.

The interference films 11 and 12 for removing laser light comprise the narrow-band laser cut filter $F_n$ for removing YAG laser light and the wide-band laser cut filter $F_w$ for removing semiconductor laser light, respectively, and have the same characteristics as the laser cut filters 3 and 4 of the first embodiment.

The interference films 11 and 12 are located to satisfy Eq. (1). Specifically, the interference film 12, which is the wide-band laser cut filter providing greater changes of the optical properties of visible light, such as the transmittance and ripple, in the visible region, is placed at the position where the incident angle $\theta_{12}$ of the chief ray becomes smaller so as not to affect the visible region. On the other hand, the interference film 11, which is the narrow-band laser cut filter which does not undergo the changes of the optical properties in the visible region even when the incident angle of the chief ray is increased, is located at the position where the incident angle $\theta_{11}$ of the chief ray is larger than the angle $\theta_{12}$.

In the second embodiment, besides the effect of the first embodiment, the coatings of the interference films for removing laser light on lenses do away with the need for plane-parallel laser cut filters. Consequently, optical system, lessen the number of parts, and reduce manufacturing costs.

In this embodiment, the narrow-band cut filter 11 may be replaced by the filter $F_{rl}$ with a low elimination rate of laser light (namely, with a high spectral transmittance), while the wide-band cut filter 12 may be replaced by the filter $F_{rh}$ with a higher elimination rate of laser light (namely, with a lower spectral transmittance).

Figure 5:
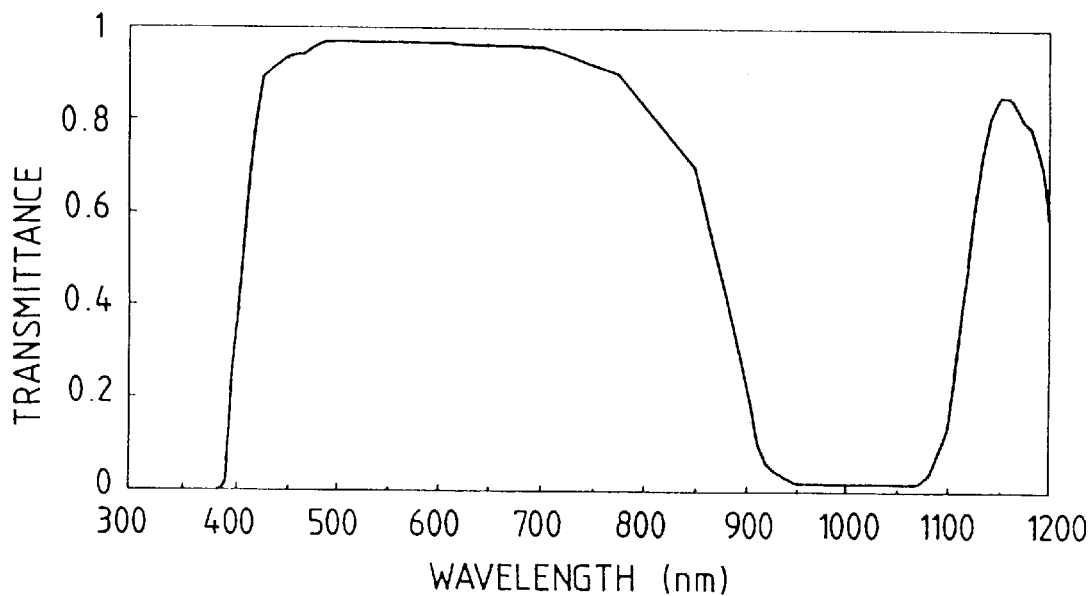
FIG. 5 is a graph showing spectral transmittance characteristics of a laser cut filter in which the elimination rate of laser light is low.

The spectral transmittance characteristics of the interference films 11 and 12 for removing laser light used as the filters are shown in FIGS. 5 arid 6, respectively.

The interference films 11 and 12 are positioned to satisfy Eq. (2). Specifically, the interference films 11 and 12 are located at the positions where $\theta_{11} > \theta_{12}$. Such an arrangement is suitable for the case where the powers of lasers vary with their types.

For changes of the optical properties (spectral transmittances and ripples) in the visible region by the angle of incidence of the ray on the interference films 11 and 12 for removing laser light, the interference film 12 is greater than the interference film 13. This is because the interference film 12 is designed so that the elimination rate of laser light is higher. Thus, in order to lessen an adverse effect on visible light, the interference film 12 with a higher elimination rate of laser light is located at the position where the incidence angle of the chief ray is smaller. The interference film 11, on the other hand, is lower in the elimination rate of laser light, and thus even though the incident angle of the chief ray is increased, the changes of the optical properties in the visible region will be less. For this reason, the interference film 11 with a lower elimination rate of laser light is located at the position where the incident angle of the chief ray is relatively large. Hence, the arrangement of the interference films mentioned above allows the influence of each laser cut filter on the transmittance and ripple of visible light to be lessened over the entire optical system, and consequently an observation image with good color reproducibility can be secured.

Figure 7:
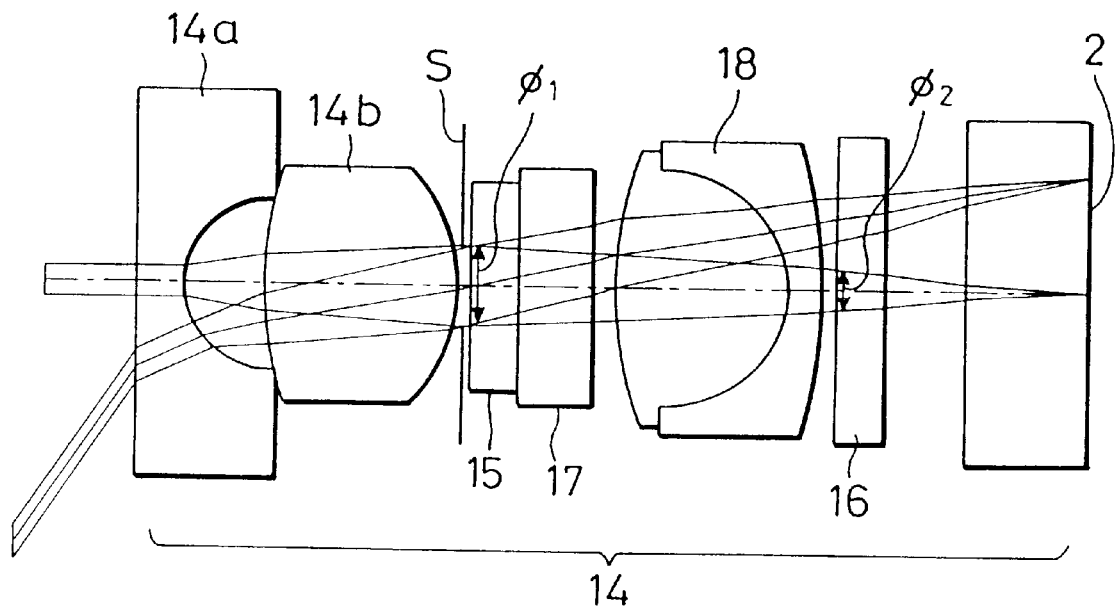
FIG. 7 is a sectional view showing the arrangement of a third embodiment of the endoscope optical system according to the present invention.

FIG. 7 shows the arrangement of a third embodiment of the endoscope optical system according to the present invention. An objective optical system 14 includes filters 15 and 16 for removing laser light, an aperture stop S, an infrared absorption filter 17, and the solid-state image sensor (CCD) 2. An incident beam of light is diverged by a first negative lens 14a and increases in diameter to enter a second positive lens 14b. The light beam emerging from the second positive lens 14b, because of its positive power, becomes a convergent beam, which passes through the stop S and is incident, with a diameter $\phi_1$, on a laser cut filter 15 situated immediately behind the stop S. The light beam gradually becomes fine and traverses the filter 17. Subsequently, the light beam is converged further by a cemented positive lens 18 placed behind the filter 17 into a smaller diameter $\phi_2$ and enters the laser cut filter 16. After that, the light beam form an image in the CCD 2 located at the imaging position of the objective optical system 14.

The interference filter 15 is the wide-band cut filter $F_w$ in which the transmittance is kept to a minimum in a wide range of wavelengths to remove various kinds of semiconductor laser light of different wavelengths, while the interference filter 16 is the narrow-band cut filter $F_n$ in which the transmittance is kept to a minimum in a narrower range of wavelengths to remove YAG laser light. The spectral transmittance characteristics of these interference filters 15 and 16 are as shown in FIG. 3 and 2 respectively.

In the third embodiment, the wide- and narrow-band cut filters 15 and 16 are arranged so as to satisfy Eq. (3). The beam diameter $\phi_1$ at the position of the wide-band cut filter 15 is larger than the beam diameter $\phi_2$ at the position of the narrow-band cut filter 16. In order to keep the spectral transmittance to a minimum over a wide range of wavelengths, the wide-band cut filter 15 is such that the thickness of its interference film is made to be large and thus its surface is liable to become damaged. Hence, the wide-band cut filter 15 is placed close to the aperture stop S at the position where the beam diameter is relatively large so that flaws in the surface of the filter are inconspicuous with respect to the observation image. The narrow-band cut filter 16, by contrast, need not keep the spectral transmittance to a minimum over a wide range of wavelengths, and thus the thickness of the interference film is not very large. Consequently, the surface of the filter is not so much damaged. In this way, the narrow-band cut filter 16, even when placed farther from the aperture stop S at the position where the beam diameter is relatively small, does not exert an adverse influence on the observation image because the surface of the filter suffers but little damage.

By the above arrangement, flaws in the surface of the filter for removing laser light can be made inconspicuous with respect to the observation image, and hence an observation image of good quality can be secured.

In the third embodiment, the wide-band cut filter may be replaced by the filter $F_{rh}$, with a high elimination rate of laser light (namely, with a low spectral transmittance) while the narrow-band cut filter 16 may be replaced by the filter $F_{rl}$ with a lower elimination rate of laser light (namely, with a higher spectral transmittance)

Figure 6:
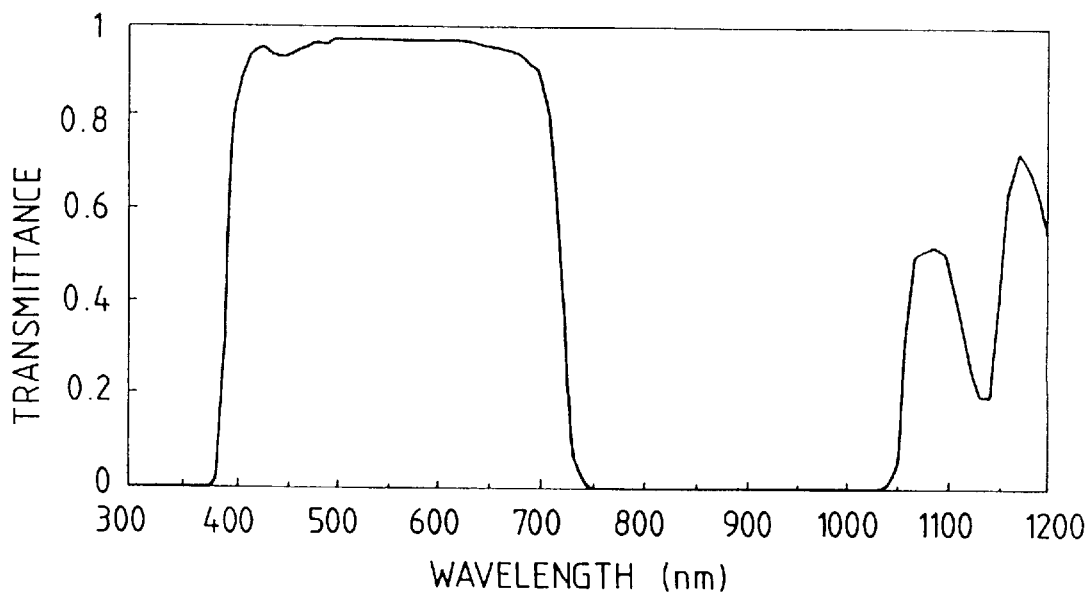
FIG. 6 is a graph showing spectral transmittance characteristics of a laser cut filter in which the elimination rate of laser light is higher.

The spectral transmittance characteristics of the laser cut filters 15 and 16 are as shown in FIGS. 6 and 5, respectively.

In this modified embodiment, the filter 15 with a high elimination rate of laser light and the filter 16 with a lower elimination rate are arranged so as to satisfy Eq. (4). The beam diameter $\phi_1$ at the position of the laser cut filter 15 is larger than the beam diameter $\phi_2$ at the position of the laser cut filter 16. Even with this arrangement, flaws in the surface of each filter for removing laser light can be made inconspicuous with respect to the observation image, and hence an observation image of good quality can be secured.

Figure 8:
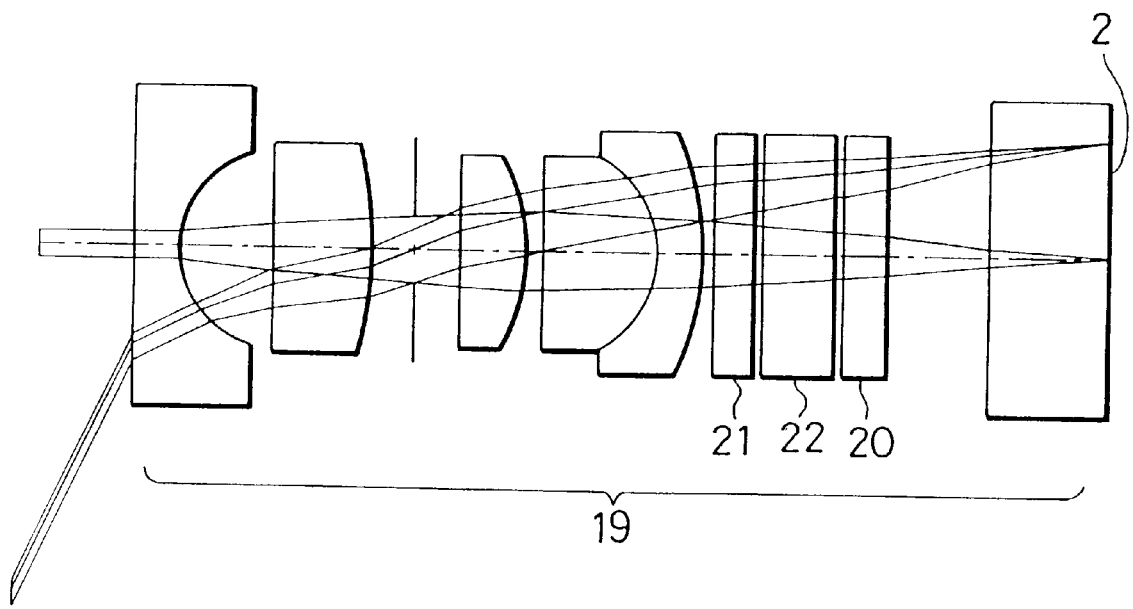
FIG. 8 is a sectional view showing the arrangement of a fourth embodiment of the endoscope optical system according to the present invention.
Figure 9:
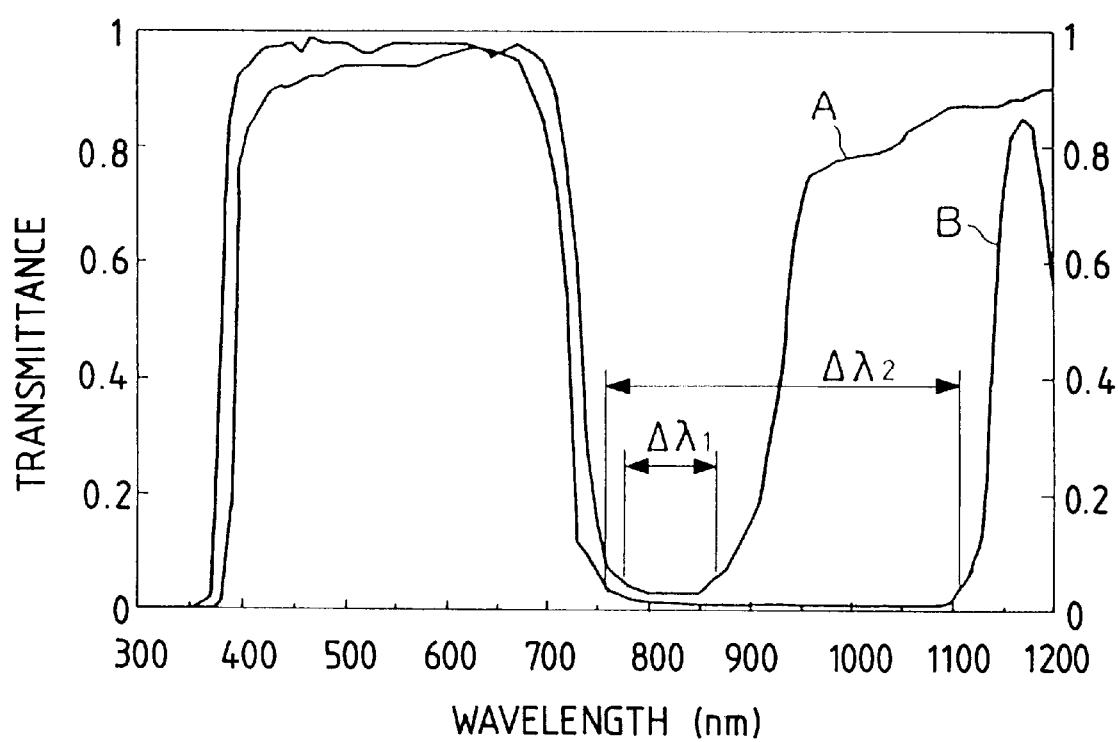
FIG. 9 is a graph showing spectral transmittance characteristics of laser cut filters used in the fourth embodiment.

FIG. 8 shows the arrangement of a fourth embodiment of the endoscope optical system according to the present invention. An objective optical system 19 includes filters 20 and 21 for removing laser light and an infrared absorption filter 22. In FIG. 9, the spectral transmittance characteristics of the laser cut filters 20 and 21 in the fourth embodiment are represented by curves A and B, and the wavelength regions in which the laser light can be removed by the laser cut filters 20 and 21 are designate by $\Delta\lambda_1$ and $\Delta\lambda_2$, respectively.

The wavelength regions in which the laser light can be removed by the laser cut filters 20 and 21 are found by Eqs. (5) to (7). That is, the wavelength region $\Delta\lambda_1$ in which the laser light can be removed by the laser cut filter 20 is contained in the wavelength region $\Delta\lambda_2$ in which the laser light can be removed by the laser cut filter 21, and is narrower than the region $\Delta\lambda_2$.

In this optical system, laser light with wavelengths of approximately 800 nm is removed by both the laser cut filters 20 and 21 so that the elimination rate of laser light in this wavelength region is raised in terms of the entire optical system to be able to accommodate a high-power laser. In this way, the laser light is removed by the two laser cut filters, and thereby light from the high-power laser can also be removed even though the transmittance of each of the laser cut filters is not kept to a minimum. Moreover, because the transmittance of the laser cut filter need not be kept to a minimum, it is not necessary to make the film thickness large and the changes of the optical properties of visible light in the visible region by the incident angle can be reduced. In addition, the surface of the filter can be made hard to damage and thus a favorable observation image is obtained.

In contrast to this, laser light with wavelengths of approximately 1060 nm is removed by the laser cut filter 21 alone, not by the laser cut filter 20. In this wavelength region, since the laser light is cut only by one surface of the laser cut filter 21, the optical system is not applicable to the high-power laser. In general use, however, only the laser cut filter 21 is satisfactory for elimination of laser light. In this way, if the transmittance of the laser cut filter 21 of one of the two laser cut filters is lowered over a wider range of wavelengths, thereby removing other kinds of laser light, laser light from a plurality of general-power lasers producing different wavelengths as well as from high-power laser treatment units can be removed.

What is claimed is:

1. An endoscope optical system used in an endoscope combined with at least two kinds of laser treatment units emitting different wavelengths, said endoscope optical system comprising:

at least two filters provided in an optical path of said endoscope optical system, said at least two filters being interference filters for removing laser light, having spectral transmittance characteristics different from one another, and being arranged at respective positions where angles of incidence or emergence of a chief ray at said at least two filters are different.

2. An endoscope optical system used in an endoscope combined with at least two kinds of laser treatment units emitting different wavelengths, said endoscope optical system comprising at least two filters provided in an optical path of said endoscope optical system, said at least two filters being interference filters for removing laser light, having spectral transmittance characteristics different from one another, and being arranged at respective positions where diameters of a beam of light are different.

3. An endoscope optical system according to claim 1 or 2, wherein said at least two filters remove laser light of different wavelengths.

4. An endoscope optical system according to claim 1, wherein said at least two filters are arranged in such a way that a surface or optical element having a refracting power is interposed therebetween.

5. An endoscope optical system according to claim 4, wherein said at least two filters include a wide-band cut filter ($F_w$) and a narrow-band cut filter ($F_n$), said wide-band cut filter ($F_w$) and said narrow-band cut filter ($F_n$) being arranged at positions satisfying the following condition:

$$\theta_n > \theta_w$$

where $\theta_w$ and $\theta_n$ are angles of incidence or emergence of the chief ray at coated surfaces for removing laser light of said filters $F_w$ and $F_n$, respectively.

6. An endoscope optical system according to claim 4, wherein at least one of said at least two filters is different from a remaining filter in elimination rate of laser light so that a filter $F_{rl}$ in which the elimination rate of laser light is low and a filter $F_{rh}$ in which the elimination rate of laser light is higher are arranged at positions satisfying the following condition:

$$\theta_{rl} > \theta_{rh}$$

where $\theta_{rl}$ and $\theta_{rh}$ are angles of incidence or emergence of the chief ray at coated surfaces for removing laser light of said filters $F_{rl}$ and $F_{rh}$, respectively.

7. An endoscope optical system according to claim 2, further comprising an aperture stop (S), wherein said at least two filters include a wide-band cut filter ($F_w$) and a narrow-band cut filter ($F_n$), said wide-band cut filter ($F_w$) and said narrow-band cut filter ($F_n$) being arranged at positions satisfying the following condition:

$$SF_w < SF_n$$

where $SF_w$ is a distance between said aperture stop (S) and said filter $F_w$, and $SF_n$ is a distance between said aperture stop (S) and said filter $F_n$.

8. An endoscope optical system according to claim 2, further comprising an aperture stop (S), wherein at least one of said at least two filters is different from a remaining filter in elimination rate of laser light so that a filter $F_{rl}$ in which the elimination rate of laser light is low and a filter $F_{rh}$ in which the elimination rate of laser light is higher are arranged at positions satisfying the following condition:

$$SF_{rl} > SF_{rh}$$

where $SF_{rl}$ is a distance between said aperture stop (S) and said filter $F_{rl}$, and $SF_{rh}$ is a distance between said aperture stop (S) and said filter $F_{rh}$.

9. An endoscope optical system used in an endoscope combined with at least two kinds of laser treatment units emitting different wavelengths, said endoscope optical system comprising:

at least two filters provided in an optical path of said endoscope optical system, said at least two filters including interference filters $F_a$ and $F_b$ for removing laser light, said interference filters $F_a$ and $F_b$ having spectral transmittance characteristics different from one another, and wavelength regions in which laser light is removed by said interference filters $F_a$ and $F_b$ satisfying the following conditions:

$$\lambda a, max - \lambda, min > \lambda b, max - \lambda b, min$$

$$\lambda a, min \leq \lambda b, min$$

$$\lambda a, max \geq \lambda b, max$$

where ($\lambda$a, max) and ($\lambda$a, min) are maximum and minimum values of a wavelength region in which laser light is removed by said filter $F_a$ and ($\lambda$b, max) and ($\lambda$b, min) are maximum and minimum values of a wavelength region in which laser light is removed by said filter $F_b$.

10. An endoscope optical system used in an endoscope combined with at least two kinds of laser treatment units emitting different wavelengths, said endoscope optical system comprising:

at least two filters provided in an optical path of said endoscope optical system, wherein said at least two filters are filters for removing laser light and are arranged at respective positions where angles of incidence or emergence of a chief ray at said at least two filters are different with a surface or optical element having a refracting power being interposed therebetween, and wherein at least one of said at least two filters is different from a remaining filter in elimination rate of laser light so that a filter $F_{rl}$ in which the elimination rate of laser light is low and a filter $F_{rh}$ in which the elimination rate of laser light is higher are arranged at positions satisfying the following condition:

$$\theta_{rl} > \theta_{rh}$$

where $\theta_{rl}$ and $\theta_{rh}$ are angles of incidence or emergence of the chief ray at coated surfaces for removing laser light of said filters $F_{rl}$ and $F_{rh}$, respectively.

11. An endoscope optical system used in an endoscope combined with at least two kinds of laser treatment units emitting different wavelengths, said endoscope optical system comprising:

at least two filters provided in an optical path of said endoscope optical system; and an aperture stop (S), wherein said at least two filters are filters for removing laser light and are arranged at respective positions where diameters of a beam of light are different, and wherein at least one of said at least two filters is different from a remaining filter in elimination rate of laser light so that a filter $F_{rl}$ in which the elimination rate of laser light is low and a filter $F_{rh}$ in which the elimination rate of laser light is higher are arranged at positions satisfying the following condition:

$$SF_{rl} > SF_{rh}$$

where $SF_{rl}$ is a distance between said aperture stop (S) and said filter $F_{rl}$, and $SF_{rh}$ is a distance between said aperture stop (S) and said filter $F_{rh}$.

* * * * *